(12) United States Patent
Whealton et al.

(10) Patent No.: US 6,785,330 B1
(45) Date of Patent: Aug. 31, 2004

(54) FLEXIBLE VIDEO ENCODING/DECODING METHOD

(75) Inventors: Matthew J. Whealton, Washington, DC (US); Kwok L. Li, Besthesda, MD (US); Jonathan M. Katz, College Park, MD (US)

(73) Assignee: Ghildra Holdings, Inc., MD (US)

( * ) Notice: Subject to any disclaimer, the term of this patent is extended or adjusted under 35 U.S.C. 154(b) by 702 days.

(21) Appl. No.: 09/640,867

(22) Filed: Aug. 18, 2000

Related U.S. Application Data

(60) Provisional application No. 60/149,475, filed on Aug. 19, 1999.

(51) Int. Cl.[7] .......................... H04N 7/12; H04N 5/445
(52) U.S. Cl. ............................................... 375/240.11
(58) Field of Search ..................... 375/240.11, 240.1, 375/240.18, 240.05, 240.22, 240.27; 725/87, 40, 43, 90; 348/563, 564, 565; H04N 7/12, 5/445

(56) References Cited

U.S. PATENT DOCUMENTS

| | | | | |
|---|---|---|---|---|
| 5,349,383 A | * | 9/1994 | Parke et al. ............. | 375/240.1 |
| 6,496,980 B1 | * | 12/2002 | Tillman et al. ............... | 725/90 |
| 6,510,553 B1 | * | 1/2003 | Hazra ........................... | 725/87 |
| 6,532,263 B2 | * | 3/2003 | Radha et al. ............ | 375/240.1 |
| 6,532,562 B1 | * | 3/2003 | Chou et al. ................. | 714/746 |
| 6,614,936 B1 | * | 9/2003 | Wu et al. .................... | 382/238 |

OTHER PUBLICATIONS

"Digital Video: An Introduction to MPEG–2", Barry G. Hoskell, Atul Puri and Arun N. Netravali, 1997, pp. 361, 362, 382, 383.

"Digital Video Representation and Transmission—A Tutuorial", Reed M. Burkhart.

"Arithmetic Encoding".

* cited by examiner

*Primary Examiner*—Nhon Diep
(74) *Attorney, Agent, or Firm*—Nixon Peabody LLP; Donald R. Studebaker

(57) ABSTRACT

A method for encoding and transmitting a video signal which includes creating a low bit rate video transport stream from the video signal. Excluded bits derived from the video signal which were not included in the base transport stream are included in one or more separate enhancement transport streams. The base transport stream and each enhancement transport stream is then separately transmitted over at least one communications network.

22 Claims, 2 Drawing Sheets

FLEXIBLE VIDEO ENCODING/DECODING METHOD

This application is a continuation-in-part application of copending U.S. Provisional Patent Application Serial No. 60/149,475 filed Aug. 19, 1999.

BACKGROUND OF THE INVENTION

Digitally encoded video has become a desirable alternative to analog video for transmitting a visual representation for display. The International Organization for Standards Moving Picture Experts Group has approved an audio/visual digital compression standard designated MPEG-2. Digitization can cause bandwidth expansion, as the transmission of digital bits may require more bandwidth space than would the nondigital analog signal. The digital encoding of a video camera output can produce millions of bits per second, the transmission of which would be prohibitively expensive. Therefore, data rate reduction to reduce transmission costs is desirable, and methods for digital compression have been developed to reduce the average number of bits per page by eliminating redundant or superfluous information.

In normal MPEG video encoding, the quantization matrices force many higher frequency discrete cosine transform (DCT) coefficients to zero as a way to limit the bandwidth of the signal. MPEG-2 technology provides for both constant bit rate (CBR) and variable bit rate (VBR) signal delivery for differing applications. In general, broadcast applications require CBR signals while DVD or file based delivery can be VBR. Due to the highly variable number of bits required to encode the various picture types (both due to picture content and predictive coding), the way CBR delivery is achieved is by monitoring an outgoing picture buffer. The buffer's fullness is used to provide negative feedback in the quantization step. When the buffer gets too full, the quantization scale factor is increased, thereby truncating more bits and lowering the bit rate flowing into the buffer. The bits which are siphoned off by this process may be discarded, thereby reducing the quality of the transmitted video. In some instances, these bits are requantized and transmitted as enhancement bits in a single stream with the basic lower quality video, for the conventional MPEG-2 system is designed to transmit compressed digital video data in a single stream. The problem with transmitting the basic digital video and a block of enhancement bits in a single stream is that all reception stations are required to receive the total stream, thereby incurring the costs involved in transmitting the complete stream to stations which are to receive only the basic, unenhanced signal. These stations operate to discard the transmitted enhancement bits and the transmission costs for these bits are lost.

SUMMARY OF THE INVENTION

It is a primary object of the present invention to provide a novel and improved video encoding/decoding method for subdividing a high quality video signal into a plurality of MPEG compressed transport streams (enhancement wedges) and a base transport stream (base wedge) which are separately transmitted and selectively recombined at decoders to form a series higher quality MPEG-2 compliant video streams.

Another object of the present invention is to provide a novel and improved video encoding method for creating from a high quality video signal a low bit rate MPEG-2 video base transport stream while allowing bits to be siphoned off into one or more separate transport streams (enhancement wedges).

Yet another object of the present invention is to provide a novel and improved video encoding method for subdividing a high quality video signal into a video base transport stream and one or more transport streams (enhancement wedges) and providing a parallel encoding process for MPEG encoding each transport stream including the base transport stream.

A further object of the present invention is to provide a novel and improved video encoding method for subdividing a high quality video signal into a video base transport stream (base wedge) and one or more enhancement transport streams (enhancement wedges) with each enhancement wedge carrying information on wedge bit allocations.

A still further object of the present invention is to provide a novel and improved video encoding/decoding method for subdividing a high quality video signal into a base transport stream (base wedge) and a plurality of enhancement transport streams (enhancement wedges) and selectively providing a subscriber with only the base transport stream or the base transport stream combined with one or more of the enhancement wedges to which the subscriber subscribes to provide varying quality video to different subscribers.

These and other objects are achieved by providing a novel and improved video encoding/ decoding method wherein a normal MPEG encoding process is employed. However, when the outgoing picture buffer becomes full, bits from the encoded video which are siphoned off by the quantizing step are divided out into separate enhancement wedges while the remaining encoded video is transmitted as a base wedge or stream. The prequantized signal is compared to the postquantized signal to determine if additional bits should be shifted from a lower enhancement wedge to the next highest enhancement wedge. The base wedge and each enhancement wedge are transmitted separately to selective receiving locations and are not transmitted in a single stream. Thus receiving stations which are to receive different video qualities receive only the video quality designated for that receiving station, and no bits need to be discarded at receiving stations which subscribe to lower quality video signals.

DESCRIPTION OF THE PREFERRED EMBODIMENTS

Figure 1:
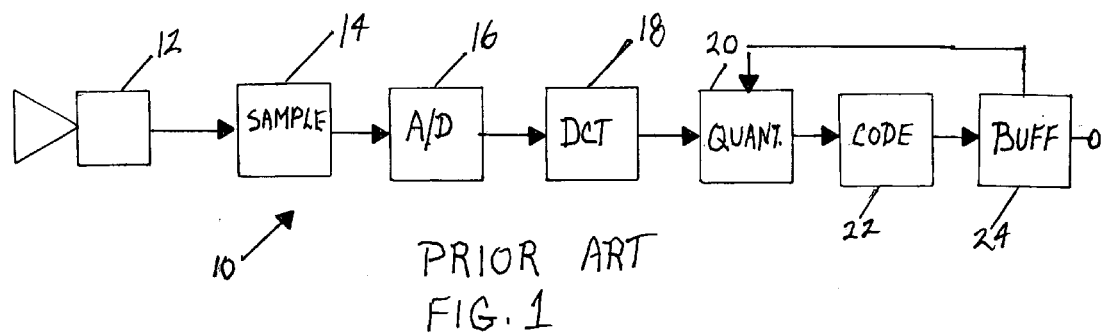
FIG. 1 is a block diagram of a prior art video encoding system.

FIG. 1 discloses a basic prior art video encoding system 10 wherein analog video signals from a video camera 12 or another known video signal source are sampled at 14 and digitized at 16. In the sampling and digitizing steps, the uncompressed, unencoded video is divided into blocks which, for example, may be 8 by 8 bit blocks containing bits for luminance resolution and bits for chrominance resolution. The digitized blocks are then sent for further encoding at the lowest acceptable bit rate designed to maximize video quality while minimizing bandwidth. A discrete cosine transform (DCT) section 18 operates on a block by block basis to convert each block of pixels into DCT coefficients which can be represented with fewer bits. These DCT coefficients are directed to a quantizer 20 which reduces the number of bits representing the DCT coefficients in accordance with quantization tables which determine how many bits represent each DCT coefficient. Quantization zeros many high spatial frequency DCT coefficients to compress the digital video output. The quantized signal is then subjected to variable length coding at 22 to provide variable length integers which improve compression. Variable length coding represents a length of digital numbers in block form, and Huffman coding is normally used for an MPEG-2 coding system. Mathematical algorithms that represent frames composed of macro-blocks and blocks are used with associated motion-prediction vectors. These blocks include I blocks, P blocks and B blocks. I blocks are basic blocks using only internal frame a block reference; P blocks use internal and past block or frame references and B blocks use internal, future and past frame or block references. A repeating pattern of an I block followed by a pattern of P and B blocks is normally used.

After the variable length coding step, the coded output bits are sent to an outgoing picture buffer 24, and if the buffer is full, feedback at 26 to the quantizer occurs to vary the quantizer scale factor to lower the bit rate to the buffer. Detailed descriptions of MPEG encoding are provided by *Digital Video: An Introduction to MPEG-2* by Barry G. Haskell, Atul Puri and Arum N. Netravali; Chapman & Hall, International Thomson Publishing, 1997.

The encoder/decoder method of the present invention permits one arbitrarily high quality video source to be subdivided into a plurality of MPEG compressed transport streams, such that the base wedge (transport stream) is a compliant, low bit rate MPEG2 video transport stream and the (one or more) enhancement wedge(s) (also transport streams) form a (series of) higher quality MPEG2 compliant video streams. The advantage of the method is that it overcomes the problem of delivering one video source to multiple customers at differing bandwidth/ quality of service levels The method provides a configurable extraction of DCT coefficient into the various base and enhancement streams. Conceptually, this is analogous to following the normal MPEG encoding pathway up to the point of having created I, P and B pictures (i.e. motion has been predicted and macro blocks are ready for run length coding and Huffman coding). At this point, a configurable number of bits from each block structure are extracted and sent to a set of picture buffers, one for the base wedge and one for each desired enhancement wedge. The blocks are thus split into each wedge so that each wedge carries a partial set of bits. Note that the quantization matrices can be set to either a shallower rolloff than usual or set to all is (no quantization truncation) in tandem with this method, to allow up to full bit capture of the digital source in the enhancement wedges. In normal MPEG, the quantization matrices force many higher frequency DCT coefficients to zero as a way to limit the bandwidth of the signal. Our method allows the bits to be siphoned off into the enhancement wedges without loss if desired. The blocks are split in such a way that effectively discrete cosine transform (DCT) bits including bits lost in the (lossy) quantization steps can be siphoned off into the enhancement wedge streams according to the information in set of non-volatile and configurable wedge bit matrices and a set of time varying bit matrices that handle bit loss due to quantization. Once the picture has been divided, a process is created for each wedge for finishing the MPEG encoding process. These parallel encoding processes continue normal run length and variable length coding and header encapsulation to produce as many transport streams as there are desired wedges. The base wedge is a conforming MPEG2 stream and requires no special processing before decoding by a standard decoder. Each enhancement wedge is structured as a transport stream with either a: one private stream containing the video enhancement bits or b: one private data stream as in a: and an additional audio enhancement stream. Each transport stream will also carry information on the wedge bit allocations in the form of either a: data in the System Information Stream (PID=0×1FFC) or b: in User Data in the Program Map table stream (PID=0×0000).

The resulting wedge transport streams can be transported across networks in such a way that users can receive varying qualities of video according to the set of wedges to which they subscribe.

Figure 2:
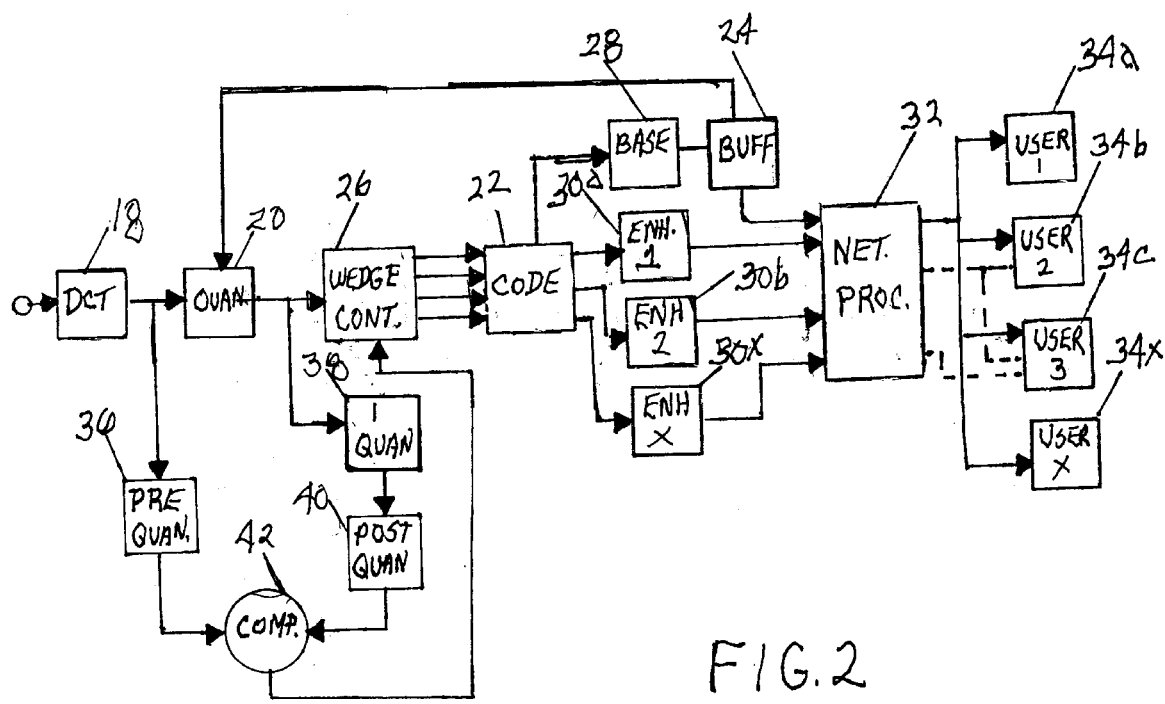
FIG. 2 is a block diagram of the video encoding section, transmission network and receiver decoding stations which use the method of the present invention.

As will be noted in FIG. 2, when the video signal has been processed to the point where the discrete cosine signal is formed at 18, this signal is passed to the quantizer 20 and then to a wedge formulating controller 26. If the outgoing picture buffer 24 is full, bits are extracted by the wedge formulating controller 26 for enhancement wedges. The wedge formulating controller provides a base wedge to a base wedge picture buffer 28, and determines which of the enhancement wedge picture buffers 30a, 30b, and 30x will receive enhancement wedges from the extracted bits. Flow control is achieved by increasing or decreasing the quantizer scale code according to picture buffer fullness. In the case of the base wedge configured for CBR the base wedge picture buffer 28 is monitored to provide feedback to the quantizer. If a combination of base and some enhancement wedges is to be treated as a CBR group, the group is combined and provided in combination to the picture buffer 24 which is monitored for fullness.

As illustrated in FIG. 2, the base wedge is sent separately over a network by a network processor 32 which also separately receives the enhancement wedges in separate streams from the enhancement wedge pictures buffers 30a, 30b and 30x. The network transmits the base wedge or stream to all user stations 34a, 34b, 34c and 34x, but only selected user stations which have subscribed to a higher quality picture receive one or more of the enhancement wedges. One or more enhancement wedges separately received are combined at the receiving user station with the base wedge to enhance the quality of the base wedge picture.

Bits are apportioned into the wedge picture buffers in the following manner. Each transport stream may and the base wedge stream must carry appropriate control information that defines the number of wedges in use in the system and the bits allocated to each pixel in each wedge. The bit allocations are defined by the use of bit tables. There are two tables for bit allocations for each wedge, one for I pictures and another for P and B pictures, analogous to the use of separate quantization tables for these different kinds of pictures. Each table contains 64 entries, corresponding to the pixels in one block. Each entry specifies the number of bits to be allocated to the wedge for this pixel position. As an example, a system using two enhancement wedges would use 6 bit tables, 2 for the base wedge and 2 each for the two enhancement wedges. Each entry in each table comprises 8 bits, consisting of an unsigned four-bit number representing the number of bits to allocate. Note that the range of this number (0 to 15) is larger than the current standard 10 or 11 bits used by video capture devices, and thus allows for expansion if future capture systems use more precise digitization. The entries also contain flags indicating whether data is present for the pixel and whether the bits are being apportioned as redundant duplicates of bits already apportioned to an earlier wedge. It is envisioned that each pixel's bits will be allocated across several wedges, though there is no rule requiring this. A pixel may be configured for transmission in just one wedge (e.g., the 0,0 "DC" coefficient is always the most important and may be entirely transmitted in the base wedge). There is a rule that the sum of bits allocated across all wedges for each bit not exceed the digitization maximum (10 or 11 bits) unless the bits are marked as redundant.

Figures 3, 4:
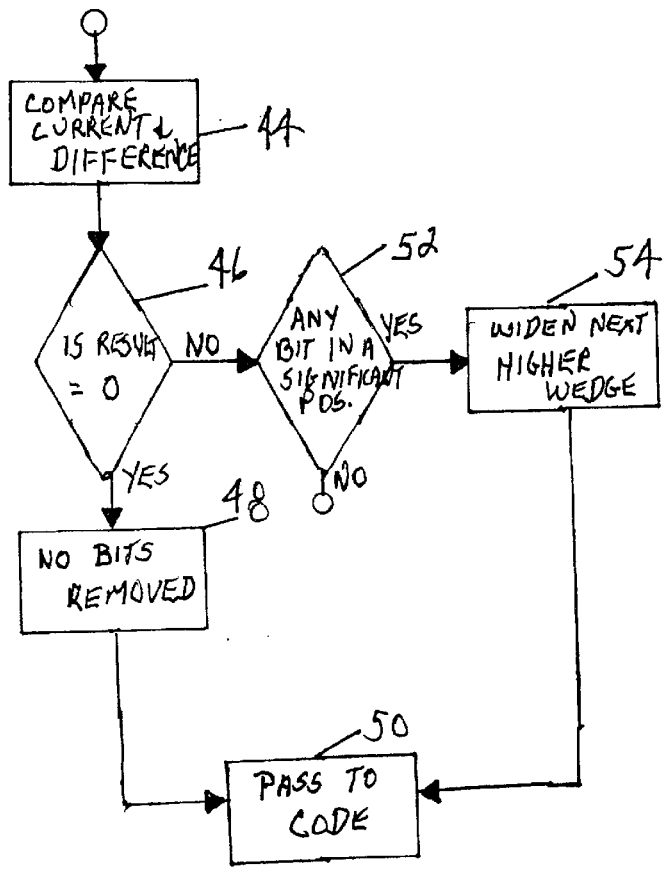
FIG. 3 is a diagram showing a bit allocation for the base and enhancement wedges of the present invention.
FIG. 4 is a flow diagram showing the operation of the wedge controller of FIG. 3.

FIG. 3 shows a partial view of several bit tables, illustrating the allocation of several coefficients across a base wedge and two enhancement wedges. Note that the figure represents an 11-bit system and that the DC (0,0) coefficient is entirely transmitted in the base wedge and first enhancement wedge, while the (0,1) coefficient is spread across all three wedges. The figure does not illustrate the usage of the bit present and redundancy flags.

In addition to the normal MPEG2 configuration steps, the following steps are performed in accordance with the invention: Read the number of wedges to be used. Read the wedge bit matrix for each wedge. The wedge specifies the number of DCT bits and their positions to be placed in each wedge. An example Wedge matrix structure:

Lo_Coeff: Index within Bits_Map of the first coefficient to be included in the Wedge.
  NOTE: This value corresponds to a zig-zag scan index; take special care to be sure that all relevant tables are flipped as needed.
Hi_Coeff: Index within Bits_Map of the last coefficient to be included in the Wedge.
  NOTE: This value corresponds to a zig-zag scan index; take special care to be sure that all relevant tables are flipped as needed.
Bits_Map[ ]: This 64 element array of 16 bit coefficient and layer dependent control words directs the codec to separate and combine Program_data bits from the source, with two 8 bit words in each Bits_Map element:

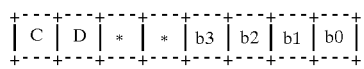

C=coeff_present_this wedge (is coeff coded?)
D=dup_coeff (has coeff been coded before?)
  B3b2b1b0=4 bit unsigned integer (how many bits coded?)
*=reserved The Intra- control word occupies the upper byte of a Bits_Map element (bits 16→9).
The Non-Intra- control word occupies the lower byte of a Bits_Map element (bits8→1).

Bits_Map data values are arranged in the same order as the DCT coefficients in a block; this order corresponds to the scan order of the block. Be sure that any functions that access the Bits_Map[] array take scan order into account.

Read the CBR (Constant Bit Rate) and VBR (Variable Bit Rate) configuration for the set of wedges. There are three possibilities: 1) All wedges may be VBR, 2) The base wedge may be CBR and all enhancements may be VBR, or 3) the base plus one or more adjacent enhancement wedges may be treated as one CBR group. There must be at least one VBR wedge if the system is to function without loss to due quantization. This condition may be relaxed if some level of lossiness is to be tolerated.

Prepare two additional wedge bit matrices, Intra_quant_adj_bits and Non_intra_quant_adj_bits. These two matrices are used to dynamically add and remove bits into the prescribed wedges as quantization loss increases and decreases. Initially load these matrices with all zeros.

Prepare a buffer for the prequantized DCT blocks called PreQuantBlock. This block will be used to form a comparison of pre and post quantization DCT blocks to allow recovery of bits dropped by flow control.

Process the video using normal MPEG2 encoding, preparing one transport stream for each configured wedge. Normally the system should override the standard quantization matrices with matrices containing all 1's (no quantization truncation except for that required by CBR flow chart). The algorithm can work even if normal quantization tables are retained, however.

At each SliceStart do:
  Reset the Intra_quant_adj_bits and Non_intra_quant_adj_bits matrices to all zeros.

As a separate process on the encoder, transmit the wedge configuration information in one of the System data streams within each Transport Stream. Two example embodiments are to encapsulate this data as user_data in the System Information Stream (PID=0x1 FFC) or as user_data in the Program Map Table stream (PID=0x000). This data is continuously transmitted in each stream to facilitate pickup of a program in process by the recombining or decoding system.

In addition to the wedge configuration, each Transport Stream is also marked with the number of the wedge it contains.

Proceed with normal processing up to the quantization step writing all headers to each of the transport streams.

Just prior to the Quantization step, copy the DCT block data into PreQuantBlock.

Proceed with the quantization step. Proceed with the inverse quantization (IQUANT) step.

Copy the reconstructed DCT block from the IQUANT process into PostQuant Block.

After the quantization steps do the following process:
  Note: The DCT, QUANT, and IQUANT steps are shown for clarity.
  Note: The Intra_quant_adj_bits and Non_intra_quant_adj_bits matrices are used when processing Intracoded pictures (I pictures) and Non-Intracoded Pictures (P and B pictures) respectively. For simplification the flow chart description bar FIG. 4 refers to these as quant_adj_bits and assumes the appropriate matrix is used according to picture type.

Processing then continues according to normal MPEG practice for the remainder of the video data input, in parallel for each wedge.

Note that flow control is achieved in MPEG2 by increasing or decreasing the quantizer_scale_code according to transmit buffer fullness. In the case of base wedge configured for CBR, the base wedge transmit buffer will be monitored to provide this feedback. If a combination of base plus some enhancement wedges is to be treated as CBR group, the transmit buffers of the group must be combined into a combination buffer that is then monitored for buffer fullness. The combination buffer is NOT an actual transmit buffer. It is simply a proxy for the some of a set of the wedge transport buffers.

This method of base wedge and enhancement wedge control will become readily apparent from a further consideration of FIG. 2 taken in conjunction with FIG. 4. The wedge formulating controller 26 determines which bits removed during the quantization step are processed into which enhancement wedge. However, this can be continuously changing as the feedback from the picture buffer 24 causes the quantization loss to increase and decrease. To sense this variation in quantization loss, the pre-quantization outputs from the DCT block 18 due stored in a pre-quantization buffer 36 and the output from the quantizer is inverted in an inversion quantized block 38 and the inverted quantized output is provided to a post-quantized signal buffer 40. The pre-quantized signal from the buffer 36 is compared with the inverted post-quantized signal from the buffer 40 in a comparison unit 42, and the result of this comparison is sent for processing in the wedge formulating controller 26.

In the wedge formulating controller, the bit matrix for the current web and quant_adj_bits is compared with the difference output from the comparison unit 42 at 44 and if the result is zero, no bits are shifted into other enhancement wedges at 48 and the wedges are separately passed at 50 to the coding block 22. Conversely, if the result at 46 is not zero, a determination is made at 52 if any bit is in a less significant position than the least significant bit in the wedge matrix for the next highest wedge. Thus if the DCT is positive, is any bit set to one in a less significant position than the least significant bit in the wedge matrix for the next higher wedge, and if the DCT is negative, is any bit set to zero in a less significant position? If so, a one is placed in these positions in the quant adjust bits and this step at 54 effectively widens the next higher wedge to include bits normally packed in the lower wedge but that have been removed by quantization. In effect, rolled off bits are captured in the next highest wedge and the reformed wedges are separately passed to coding at 50.

It is important to note in FIG. 2 that the base wedge and each enhancement wedge is transmitted separately as a separate stream to the network processor 32. The network processor contains information regarding the picture quality which each of the user stations 34a, 34b, 34c and 34x is to receive. The network processor provides the base wedge over the network to all user stations, but the picture provided by this base wedge may be enhanced if the user subscribes to one or more enhancement wedges. Thus as shown in broken lines in FIG. 2, user 34b may subscribe to only one enhancement wedge (from 30a), while user 34c may subscribe to two enhancement wedges (from 30a and 30b). Other users connected to the network may subscribe to different combinations of enhancement wedges to enhance the base wedge picture. In each case, the base wedge and each enhancement wedge is transmitted over the network in a separate stream so that each user station receives only the base wedge and the separate enhancement wedges for which that specific user has subscribed. This provides significant savings in network transmission costs, and also permits different wedges to be transmitted from the network processor over entirely different types of digital transmission systems. Thus for example, the low bandwidth base wedge might be transmitted to users over a low bandwidth telephone connection while the enhancement wedges are each transmitted by satellite transmission. When both the base wedge and the enhancement wedges are transmitted by a single type of digital transmission system, each is still transmitted as a separate stream to only the users who are to receive a predetermined picture quality.

Decoding of the encoded video described above takes place at each of the user stations 34a, 34b, 34c and 34x.

If only the base wedge (transport stream) is to be received, no additional processing is required. The base wedge is legal MPEG2 video, albeit of limited quality.

In order to decode higher quality video the decoder must receive the base wedge and one or more of the available enhancement wedges. From one of the wedge transport streams, the decoder reads the wedge matrix information transmitted in either the System Information stream or the Program Map Table stream. From each of the wedge transport streams, the decoder reads the wedge identifier for the wedge contained in the stream.

The decoder prepares a receive buffer for each wedge and begins accepting data, processing through each set of wedges and performing the normal MPEG2 preprocessing and Variable Length Decode step (VLD).

At this point the decoder has a set of block data for each wedge that contains optionally encrypted and/or watermarked partial DCT values. These partial values need to be recombined into one block (reco_block) that then is passed to the normal motion compensation step of the MPEG2 decoding process to reconstruct a picture. The recombining steps essentially replace the inverse quantization step in the normal decode process.

We claim:

1. A method for encoding and transmitting a video signal from a video signal source, comprising:

transforming blocks of m by m pixels of said video signal to generate $m^2$ transform coefficients of n-bits each;

creating a low bit rate video base transport stream from said video signal from at least a portion of the n-bits of a first of the transform coefficients;

creating one or more separate enhancement transport streams from excluded bits of the n-bits of the first transform coefficient and excluded bits from remaining transform coefficients of said video signal which were not included in said base transport stream; and separately transmitting the base transport stream and each enhancement transport stream as separate streams over at least one communications network.

2. The method of claim 1 which includes transmitting the base transport stream over said at least one communications network to all of a plurality of subscriber video receivers and separately transmitting only selected enhancement transport streams to selected subscriber video receivers.

3. The method of claim 2 which includes transmitting said base transport stream over a first communications network and transmitting each said separate enhancement transport stream over at least one second communications network which differs from said first communications network.

4. The method of claim 2 which includes transmitting no enhancement transport streams to one or more subscriber video receivers, transmitting one enhancement transport stream to one or more subscriber video receivers and transmitting a plurality of enhancement transport streams to one or more subscriber video receivers.

5. The method of claim 4 which includes transmitting said base transport stream over a first communications network and transmitting each said separate enhancement transport stream over at least one second communications network which differs from said first communications network.

6. The method of claim 1 which includes varying the content of said video base transport stream in response to variations in the bit rate flow for said video signal thereby causing variations in the excluded bits available for inclusion in said enhancement transport streams, monitoring the variations in said excluded bits, and altering the content of said one or more enhancement transport streams in response to variations in the excluded bits.

7. The method of claim 6 which includes transmitting the base transport stream over said at least one communications network to all of a plurality of subscriber video receivers and separately transmitting only selected enhancements transport streams to selected subscriber video receivers.

8. The method of claim 7 which includes transmitting said base transport stream over a first communications network and transmitting each said separate enhancement transport stream over at least one second communications network which differs from said first communications network.

9. The method of claim 7 which includes transmitting no enhancement transport streams to one or more subscriber video receivers, transmitting one enhancement transport stream to one or more subscriber video receivers and transmitting a plurality of enhancement transport streams to one or more subscriber video receivers.

10. The method of claim 9 which includes transmitting said base transport stream over a first communications network and transmitting each said separate enhancement transport stream over at least one second communications network which differs from said first communications network.

11. The method of claim 2 which includes combining the enhancement transport stream or streams received by selected subscriber video receivers with the base transport stream received by each such subscriber video receiver to obtain an enhanced quality video picture.

12. A method for encoding and transmitting a video signal from an analog video signal source over one or more communications networks to a plurality of subscriber video receivers to derive pictures of varying quality at different receivers which includes:

digitizing said analog video signal to obtain a digital video signal;

transforming blocks of m by m pixels of said digital video signal to generate $m^2$ transform coefficients of n-bits each;

creating a low bit rate video base transport stream from said digital video signal from at least a portion of the n-bits of a first of the transform coefficients;

creating one or more separate enhancement transport streams from excluded bits of the n-bits of the first transform coefficient and excluded bits from remaining transform coefficients of said video signal which were not included in said base transport stream;

transmitting the base transport stream as a separate stream over a communications network to all of said plurality of video receivers;

separately transmitting one or more selected enhancement transport streams as separate streams over a communications network to only selected ones of said video receivers; and combining the enhancement transport stream or streams received by each said selected video receiver with the base transport stream received by each selected video receiver to obtain an enhanced quality video picture.

13. The method of claim 12 wherein the quality enhancement of the video picture at each selected video receiver is dependent upon the number of separate enhancement transport streams received by said selected video receiver with the quality enhancement increasing as the number of received enhancement transport streams increases.

14. The method of claim 13 which includes quantizing said digital video signal to vary the content of said video base transport stream in response to variations in the bit flow rate for said digital video signal thereby causing variations in the excluded bits available for inclusion in said enhancement transport streams, monitoring the variations in said excluded bits and, altering the content of said one or more enhancement transport streams in response to variations in the excluded bits.

15. The method of claim 14 which includes transmitting no enhancement transport streams to one or more subscriber video receivers, transmitting one enhancement transport stream to one or more subscriber video receivers and transmitting a plurality of enhancement transport streams to one or more subscriber video receivers.

16. The method of claim 14 which includes comparing the digital video signal before quantization with the inverse of the digital video signal after quantization and using any resultant signal from the comparison to control the content of said one or more enhancement transport streams.

17. The method of claim 16 which includes transmitting no enhancement transport streams to one or more subscriber video receivers, transmitting one enhancement transport stream to one or more subscriber video receivers and transmitting a plurality of enhancement transport streams to one or more subscriber video receivers.

18. The method of claim 17 which includes transmitting said base transport stream over a first communications network and transmitting each said separate enhancement transport stream over at least one second communications network which differs from said first communications network.

19. The method of claim 1, wherein the video signal can be recovered in a lossless manner from the bits included in the base transport stream and the bits included in a number of the separate enhancement transport streams corresponding to all of the bits of all of the transform coefficients of said video signal.

20. The method of claim 1, further comprising employing a discrete cosine transform for said transforming step to generate $m^2$ discrete cosine transform coefficients of n-bits each.

21. The method of claim 12, wherein the video signal can be recovered in a lossless manner from the bits included in the base transport stream and the bits included in a number of the separate enhancement transport streams corresponding to all of the bits of all of the transform coefficients of said video signal.

22. The method of claim 12, further comprising employing a discrete cosine transform for said transforming step to generate $m^2$ discrete cosine transform coefficients of n-bits each.

* * * * *